United States Patent
Koseki

(10) Patent No.: US 7,394,055 B2
(45) Date of Patent: Jul. 1, 2008

(54) SOLID-STATE IMAGE-PICKUP DEVICE WITH COLUMN-LINE AMPLIFIERS AND LIMITER

(75) Inventor: Ken Koseki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/604,987

(22) Filed: Nov. 27, 2006

(65) Prior Publication Data

US 2007/0069112 A1    Mar. 29, 2007

Related U.S. Application Data

(63) Continuation of application No. 11/067,858, filed on Feb. 28, 2005, now Pat. No. 7,141,775.

(30) Foreign Application Priority Data

Mar. 3, 2004    (JP)    ............ P 2004-058621

(51) Int. Cl.
*H01L 27/00*    (2006.01)
*H03F 3/08*    (2006.01)
*H04N 3/14*    (2006.01)

(52) U.S. Cl. .............. 250/214 A; 250/208.1; 348/302

(58) Field of Classification Search .......... 250/208.1, 250/214 A; 348/302–304, 308
See application file for complete search history.

(56) References Cited

U.S. PATENT DOCUMENTS

| | | | |
|---|---|---|---|
| 4,233,632 A | 11/1980 | Akiyama | |
| 5,258,968 A | 11/1993 | Matsuda et al. | |
| 5,978,025 A | 11/1999 | Tomasini et al. | |
| 6,037,577 A | 3/2000 | Takanaka et al. | |
| 6,518,910 B2 * | 2/2003 | Sakuragi et al. | 341/162 |
| 6,567,571 B1 * | 5/2003 | Kochi et al. | 382/312 |
| 6,903,768 B1 * | 6/2005 | Ohsawa et al. | 348/241 |
| 6,963,371 B2 * | 11/2005 | Sakurai et al. | 348/301 |
| 2001/0025969 A1 * | 10/2001 | Inui | 257/225 |
| 2002/0054227 A1 * | 5/2002 | Hashimoto | 348/311 |

FOREIGN PATENT DOCUMENTS

JP    05-207220    8/1993

* cited by examiner

*Primary Examiner*—Thanh X. Luu
*Assistant Examiner*—Brian J Livedalen
(74) *Attorney, Agent, or Firm*—Robert J. Depke; Rockey, Depke & Lyons, LLC

(57) ABSTRACT

The levels of the power supply and the ground are kept constant against a parasitic resistance by keeping the constant current of an amplifier irrespective of the size of a pixel signal and the gain of the amplifier in this case in an image signal reading circuit system having the amplifier arranged to each column. The amplifier has a limiter at an output terminal thereof which limits an output voltage of the amplifier to a range for keeping the constant consumption-current.

10 Claims, 15 Drawing Sheets

$$VLL = \begin{cases} VDD-Vgs(T5)-Vgs(T4)+Vth(T6)\cdots Vth(T4)>Vth(T6) \\ VDD-Vgs(T5)-Vgs(T4)+Vth(T4)\cdots Vth(T4)<Vth(T6) \end{cases}$$

FIG. 10
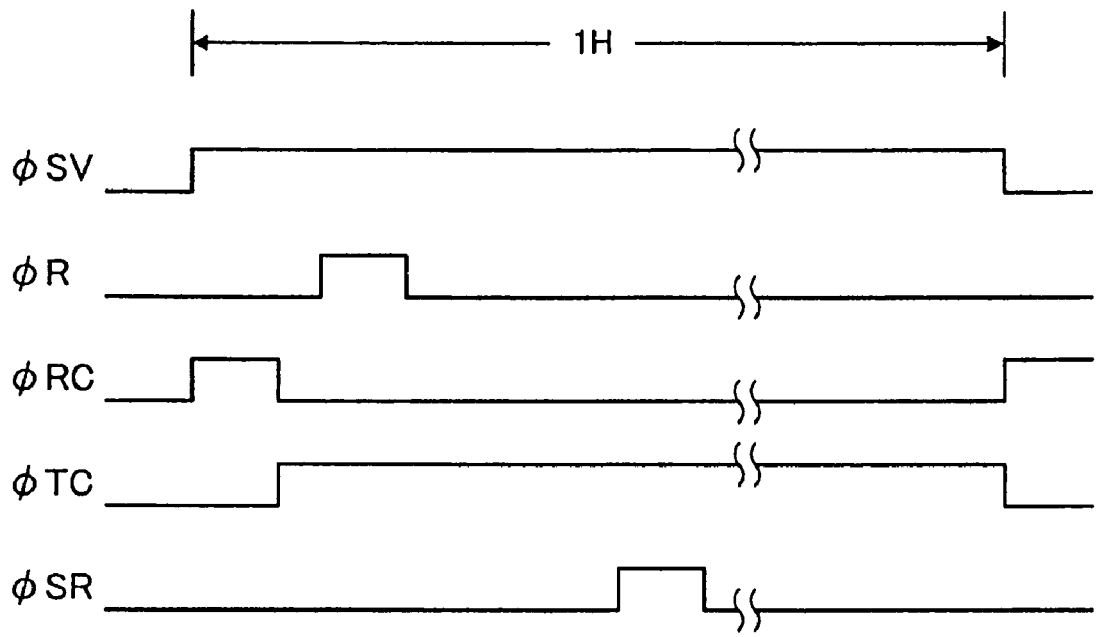
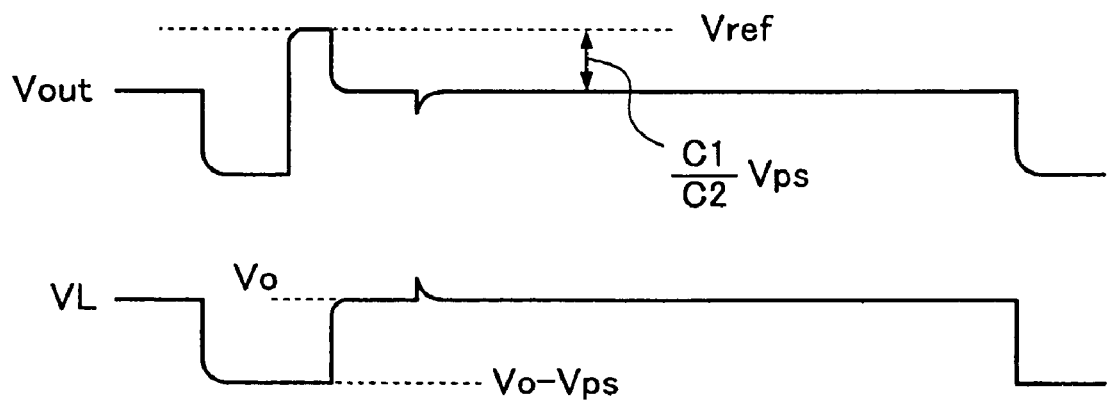

...

SOLID-STATE IMAGE-PICKUP DEVICE WITH COLUMN-LINE AMPLIFIERS AND LIMITER

The subject matter of application Ser. No. 11/067,858, is incorporated herein by reference. The present application is a continuation of U.S. Ser. No. 11/067,858, filed Feb. 28, 2005 now U.S. Pat. No. 7,141,775, which claims priority to Japanese Patent Application Number JP 2004-058621 filed Mar. 3, 2004, all of which are incorporated herein by reference.

BACKGROUND OF THE INVENTION

1. Field of the Invention

The present invention relates to a solid-state image pick-up device and a pixel signal reading method of the solid-state image pick-up device.

2. Description of the Related Art

Recently, a CMOS image sensor is focused as an image sensor in place of a CCD. The CMOS image sensor solves such problems of: the CCD that the manufacturing thereof needs a dedicated process, the operation needs a plurality of power voltages, and the operation requires the combination of a plurality of peripheral ICs to complicate the system.

The CMOS image sensor uses the same manufacturing process as that of a general worldwide produced CMOS integrated circuit (IC), and is driven by a single power-supply. Further, the CMOS image sensor can include both an analog circuit and a logical circuit using the CMOS process in the same chip and therefore can reduce the number of peripheral ICs.

Mainly, an output circuit of the CCD uses a one-channel output with an FD (Floating Diffusion) amplifier. On the contrary, the CMOS image sensor has a FD amplifier for each pixel and selects one row in a pixel array at a time for output, and simultaneously reads the pixels of the selected row in the column direction, that is, outputs the data in parallel with the column. Because the FD amplifier arranged in the pixel does not have sufficient driving capacity, a reduction in data rate is necessary, and the parallel processing is advantageous.

Further, serving as another merit, since the parallel processing suppresses the band of a signal output circuit, the noise level is thus reduced.

Various signal output circuits of the parallel-output-type CMOS image sensor are proposed. For example, the pixel output is sampled by a switching capacitor and then is read, or the pixel output is read with the amplifier arranged to each column, and in some cases, with an AD converter or a DRAM arranged to each column. The present invention particularly relates to a pixel signal reading method with an amplifier arranged to each column.

Japanese Unexamined Patent Application Publication No. 5-207220 discloses an example of the pixel signal reading method having an amplifier (e.g., single-end amplifier) arranged to each column. This will be described with reference to FIGS. 9 and 10.

FIG. 9 shows only one column corresponding to one pixel GS (circuit system of one vertical signal line VL).

The pixel GS comprises: a photodiode PD; a reset transistor Trst; an amplifying transistor Tg; and a reading transistor Ts.

In this case, an output from the pixel GS is read by using a charge integrating circuit having the capacitors C1 and C2 and a source ground amplifier 100 serving as a charge integrating amplifier. The source ground amplifier 100 comprises: a driving MOS transistor Tr16 and a load MOS transistor Tr17.

Further, in this case, the capacitor C2 serving as a feedback capacitance is pre-charged by a transistor Tr15 for switching and a reference voltage Vref. Thus, the variation in offset of the source ground amplifier 100 is suppressed.

FIG. 10 shows a timing chart of the circuit shown in FIG. 9. For a term T1 of a horizontal blanking period, the pixel GS outputs, to a vertical signal line VL, a value which is obtained by overlapping a signal Vps to an offset voltage Vo. The charge integrating circuit is reset by switching on a transistor Tr13 by a signal φRC. Similarly, the signal φRC switches on the transistor Tr15 and a signal φTC switches off a transistor Tr14, and thus the capacitor C2 pre-charges the reference voltage Vref.

For a term T2, the signals φRC and φTC switch off the transistor Tr15 and switches on the transistor Tr14, and thus the pre-charged reference voltage Vref appears at the output Vout of the charge integrating amplifier. In this case, the transistor Tr13 is switched off simultaneously with the transistor Tr15 and thus the reset state is canceled.

For a term T3, only the offset voltage Vo is output from the pixel GS and is integrated, thereby reading only a signal component of the output of the charge integrating amplifier using a ratio of the capacitors C1 and C2, serving as a gain.

Finally, the read signal is sequentially output to a horizontal signal line HL synchronously with a pulse φSR supplied from a shift register 101.

In the operation for reading the pixel signal with the amplifier arranged to each column, the offset voltage of the pixel is removed and only the signal component is extracted. Further, the reading gain is set by the ratio of the capacitors C1 and C2. In addition, advantageously, the variation in source followers is suppressed by pre-charging the reference voltage Vref.

Another example will be described with reference to FIGS. 11, 12, and 13. This example is jointly announced as "A Column-Based Pixel-Gain-Adaptive CMOS Image Sensor for Low-Light-Level Imaging" by Shizuoka University and Sony Corporation in ISSCC (International Solid-State Circuits Conference) in 2003.

Similarly to FIG. 9, FIG. 11 shows only one column corresponding to one pixel GS (circuit system of one vertical signal line VL).

In the example shown in FIG. 11, similar to FIG. 9, the signal from the pixel GS is read by a single-end amplifier AP and a charge integrating amplifier comprising capacitors C1 and C2.

The capacitor C2 comprises capacitors c21 and c22 and a switch Sφ3, and varies the capacitance depending on the switching-on/off operation of the switch Sφ3. Thus, the reading gain of the amplifier AP varies.

FIG. 12 shows a circuit example of the amplifier AP. Basically, the amplifier AP is a source ground amplifier comprising an N-channel MOS driving transistor T11 and a P-channel MOS current-source load transistor T10. Further, the amplifier AP has a regulated cascade structure, that is, having cascade-connected transistors T12 and T13 and auxiliary amplifiers As1 and As2. With this structure, an excessively higher gain is obtained as compared with the source ground amplifier 100 shown in FIG. 9.

FIG. 13 shows a driving timing.

Pulses φSV, φR, and φTX drive the pixel GS. Pulses φ1 to φ4 switch-on/off switches Sφ1 to Sφ4 shown in FIG. 11.

In this case, the same charge integrating amplifier is used and therefore the basic operation is similar to that shown in FIG. 9. The pixel GS shown in FIG. 11 is an example of a pixel with a transfer gate Tt and, in this case, as will be understood by the driving timing shown in FIG. 13, the reset operation is performed by the pulse φR, the offset voltage Vo as the reset level is read, and then a value obtained by overlapping the signal level Vps to the offset value Vo by the pulse φTX is output.

This order in the example is reverse to that shown in FIG. 9. However, in the example shown in FIG. 11, a KT/C noise at the reset timing due to the pulse φR is removed and therefore the noises are reduced. The example shown in FIG. 11 has recently become mainstream. Incidentally, the polarity of the signal output in the example shown in FIG. 11 is inverted to that shown in FIG. 9. Further, the example shown in FIG. 11 does not include the operation for pre-recharging the reference voltage Vref, the pulse φ1 switches-on the switch Sφ1, and a signal is output by using a threshold voltage for feedback as the reference. The output voltage Vout is [Vt+(C1/C2)Vps].

For example, the examples shown in FIGS. 9 and 11 are known. In the operation for reading the pixel signal with the amplifier arranged to each column as mentioned above, advantageously, the offset voltage of the pixel is removed and only the signal component is extracted without any losses. Further, the reading gain is arbitrarily set by the ratio of the capacitances.

However, the amplifier is laid-out to each column and therefore the layout area increases. The circuit structure per column must be simplified as much as possible. As described above, preferably, the relatively simple source-ground amplifier is used.

Although a differential amplifier can be used, preferably, the source ground amplifier is used in consideration of the complex circuit-structure. However, in view of PSRR (Power Supply Rejection Ratio) serving as a ratio for increasing/decreasing an input offset voltage depending on the change in power voltage, the source ground amplifier which is operated by the power supply and the ground reference deteriorates, as compared with the differential amplifier.

Here, a description is given of a specific case of a power layout pattern of the CMOS image sensor having the amplifier arranged to each column.

FIG. 14 shows a general layout-structure. Below a pixel area 200, or over and below the pixel area 200, an output circuit area 201 is arranged. In the output circuit area 201, amplifiers AP ( . . . APn, APn+1 . . . APm) are arranged to columns of vertical signal lines VL ( . . . VLn, VLn+1 . . . VLm) and therefore a large number of amplifiers AP are arranged in parallel with each other.

To each of the large number of amplifiers AP, a power supply line LVDD, a ground line LGND, or a reference signal line (not shown) of the reference voltage Vref need to be arranged. This wiring arrangement is long in parallel from PADs (power PAD and GND-PAD) on a substrate.

Then, the wiring structure becomes long and therefore the influence of a parasitic resistance r is not ignored.

In the case of using the power supply line LVDD and the ground line LGND, the current of the amplifier AP flows and therefore the influence of the parasitic resistance r causes the IR drop (voltage reduction). The potentials of power supply and ground differ between the center and the end.

Since the current flows to a line having impedance of the parasitic resistance r; the potential is always stable by setting the flowing current value to be constant. However, in the case of the source ground amplifier shown in FIG. 9, the transistor Tr17 has a transmitting conductance as the resistance and sets it as the load. Therefore, the transistor Tr17 operates as a resistance load and the current value flowing depending on the output value of the amplifier changes.

Referring to FIG. 12, a constant-current source is used as a load transistor T10. However, the constant-current source is limited in the voltage range of the operation as the constant-current source. An excessively-high-level signal is generated and then the output value becomes too high. In this case, the operating area of the current source MOS transistor enters a linear area and the load transistor T10 operates like a resistance.

The operating range will be described in the case of using the current source as the load with reference to FIGS. 15A and 15B. For a brief description, the regulated cascade as shown in FIG. 12 is not used and a simple current-source as the load is used.

Referring to FIG. 15A, a voltage Vbp1 is applied to a gate of the P-channel MOS transistor T10 and an operating voltage is set within a saturated area, thereby functioning as the current source.

The load transistor T10 functions as the current source when Vout<Vbp1+Vtp (where reference symbol Vout denotes the output voltage of the amplifier and reference symbol Vtp denotes a threshold voltage of the PMOS load transistor T10). FIG. 15B shows a graph using the abscissa axis as the output voltage Vout and the ordinate axis as current Ids. When the output voltage Vout is over a value of Vbp1+Vtp, the current Ids via the amplifier reduces. Finally, when the output voltage Vout is over a value of the power voltage VDD−Vtp, the current Ids is zero.

As mentioned above, even in the case of using the load transistor T10 as the current source, the level of the pixel signal from the pixel GS is high, a high-level signal is inputted as an input voltage Vin. In this case, the output voltage Vout of the amplifier is excessively high and then the current Ids via the amplifier changes. The input signal is not so high and then the output value is soon saturated when the gain is obtained by the ratio C1/C2. Similarly, the current via the amplifier changes.

When the current value varies depending on the amount of signals, the levels of power supply and ground change, thus causing a problem that the black level changes and the change appears in the image signal.

In the examples shown in FIGS. 11 and 13, upon reading the offset signal Vo at the reset level of the pixel GS, the threshold voltage Vt needs to be not changed after that. However, the threshold voltage Vt is generated based on the power and the ground level as the reference. Therefore, when the signal is too high and the current Ids changes upon reading the signal level Vps, the levels of power supply and ground change and thus the threshold voltage Vt simultaneously changes.

As a consequence, in order to compensate for the change, the output voltage Vout of the amplifier changes and it seems that the black level changes.

More seriously, the number of amplifiers AP corresponding to the number of columns in the horizontal direction shares the impedances of the power supply and ground, the current value of any amplifier AP changes, and then the change influences on the entire amplifiers AP.

For example, strong light is partly received to the pixel area 200, the current of the amplifier AP for reading the area changes, then, the influence is shared in the horizontal direction, and the image signal having a horizontal stripe is output. Since the part which receives the strong light is viewed as white, the slight change in black level does not need to be considered. The part is shared with the peripheral dark portion and then the change in black level becomes the horizontal stripe and this clearly appears in the image. The appearance of stripe is a serious damage for the image sensor and becomes a problem in the case of using the single-end amplifier.

In order to solve the above-mentioned problems in the case of using the single-end amplifier of the source ground amplifier, the levels of power supply and ground need to be constant and, in any case, the current via the amplifier needs to be constant.

SUMMARY OF THE INVENTION

In order to solve the above problems, it is an object of the present invention to provide a solid-state image pick-up device and a pixel signal reading method. That is, in an image signal reading circuit system having an amplifier arranged to each column, irrespective of the level of pixel signal (strength of light) and the gain of amplifier (C1/C2 of a capacitance integrating amplifier in this case), the current of the amplifier is always constant. Therefore, if the parasitic resistance exists, the levels of power supply and ground are constant and the problems of the change in black level and the horizontal stripe are prevented.

According to one aspect of the present invention, a solid-state image pick-up device comprises: an image pick-up pixel element having image pick-up pixels in the row and column directions; a vertical transfer element which outputs, to a vertical signal line arranged to each column, a pixel signal from the image pick-up pixel in each column of the row selected; a plurality of amplifier element each of which is arranged to the vertical signal line of each column and receives the pixel signals from the image pick-up pixels of each column; a limiter element which limits an output voltage range of the amplifier element, and a plurality of which are arranged to the plurality of amplifier element; and a horizontal transfer element which transfers, by a horizontal signal line, the pixel signal output by the each amplifier element.

The limiter element comprises an MOS transistor in which a source terminal thereof is connected to an output terminal of the amplifier element, a drain terminal thereof is connected to the power supply or the ground, and a gate terminal thereof is connected to a reference potential for determining a limiter level.

The amplifier element comprises: a current source MOS transistor for determining the consumption current; a cascade MOS transistor for suppressing a drain-terminal voltage of the current source MOS transistor; and an auxiliary amplifier unit which detects a drain voltage of the current source MOS transistor and applies the feedback to a gate terminal of the cascade MOS transistor so as to keep the drain voltage constant. Then, the limiter element comprises an MOS transistor in which a source terminal thereof is connected to an output terminal of the amplifier element, a drain terminal thereof is connected to the power supply or the ground, and a gate terminal thereof is connected to a gate terminal of the cascade MOS transistor.

According to another aspect of the present invention, a pixel signal reading method comprises the steps of: outputting, to a vertical signal line arranged to each column, a pixel signal from an image pick-up pixel in each column of a row selected by image pick-up pixel element having image pick-up pixels in the row and column directions; outputting the pixel signal appearing on the vertical signal while limiting, within a range, an output voltage of the amplifier element arranged to the vertical signal line of each column; and transferring the pixel signal output from the amplifier element by a horizontal signal line.

According to the present invention, the image pick-up signals in each column of the selected row are read in parallel therewith for the horizontal blanking period of the horizontal period, from the image pick-up pixel element (pixel array) comprising the image pick-up pixels in the row and column directions. The read image pick-up pixel signals in each column are output to the horizontal signal line for the valid period of the horizontal period via the amplifier element arranged to each column (vertical signal line), and are horizontally transferred.

In this case, the amplifier element comprises the limiter element at the output thereof to limit the output range of the amplifier element for setting the consumption current of the amplifier element to be constant. That is, it is possible to prevent the output range of the amplifier element which reduces the consumption current of the amplifier element.

According to the present invention, in the solid-state image pick-up device such as the CMOS image sensor, when the signals are read by arranging the amplifier to each column, the limiter element is arranged to the output terminal of the amplifier element. Thus, the consumption current of the amplifier element is always kept constant, irrespective of the level of pixel signal and the gain of the amplifier element. When the parasitic resistances of power line and ground line affect any influence, the potentials of power line and ground line are kept to be constant. Thus, it is possible to solve the problems of the change in black level of the image signal and in stripe when the strong light is partly received.

In the case of the single-end amplifier with the simple structure which is weak in change in levels of the power supply and the ground, the limiter element is arranged and thus the amplifier is used without any problems. Under the limiting condition that the amplifier element is laid-out to each column corresponding to the pixel pitch, the single-end amplifier contributes to a reduction in layout area.

Further, when the amplifier element has the regulated-cascade structure, that is, when the amplifier element comprises a current source MOS transistor for determining the consumption current, a cascade MOS transistor serially connected to suppress a drain terminal voltage of the current source MOS transistor, and an auxiliary amplifier unit for feedback to a gate terminal of the cascade MOS transistor so as to detect a drain voltage of the current source MOS transistor and to keep the constant drain voltage, the limiter element comprises an MOS transistor having a source terminal connected to the output terminal of the amplifier element, a drain terminal connected to the power supply and the ground, and a gate terminal connected to the cascade MOS transistor. Thus, the certain limiter-operation is guaranteed irrespective of the variation in devices. The margin is increased against a problem of the leakage of limiter circuit in the normal operation.

BRIEF DESCRIPTION OF THE DRAWINGS

FIG. 10 is an explanatory diagram of an operating timing according to the one conventional art;

DESCRIPTION OF THE PREFERRED EMBODIMENTS

Hereinbelow, a description is given of a solid-state image pick-up device and a pixel signal reading method in the following order.

1. Entire common structure according to the first to third embodiment.

2. Structure of amplifier/limiter according to the first embodiment.

3. Structure of amplifier/limiter according to the second embodiment.

4. Structure of amplifier/limiter according to the third embodiment.

5. Advantages according to the first to third embodiments and modification.

1. Entire Common Structure According to the First to Third Embodiment

Figure 1:
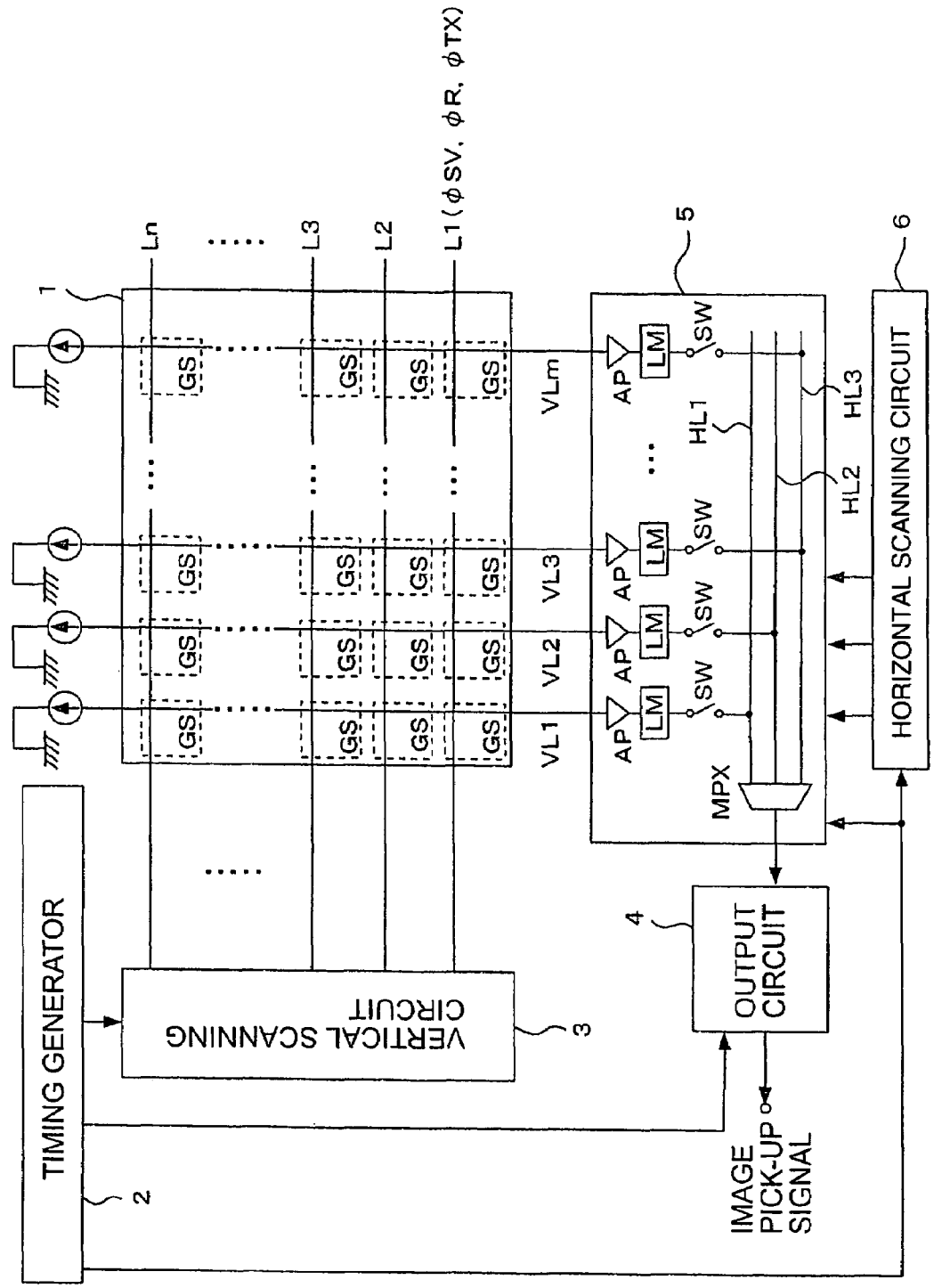
FIG. 1 is a block diagram showing a main portion of a solid-state image pick-up device according to the present invention.

FIG. 1 is a block diagram showing a main portion of a solid-state image pick-up device according to the present invention.

Referring to FIG. 1, light from a subject is incident on a pixel array 1 via a lens system (not shown). The pixel array 1 is a CMOS sensor array, and comprises a large number of image pick-up pixels GS serving as solid-state image pick-up devices (CMOS sensors) in the row and column directions.

A vertical scanning circuit 3 selects and scans the row in the pixel array 1 based on an address and a control signal supplied from a timing generator 2. According to the present invention, the rows are sequentially scanned for selection by reading the pixel in a valid area in the column parallel form. For the operation, the vertical scanning circuit 3 drives vertical scanning lines L1 to Ln.

Figure 9:
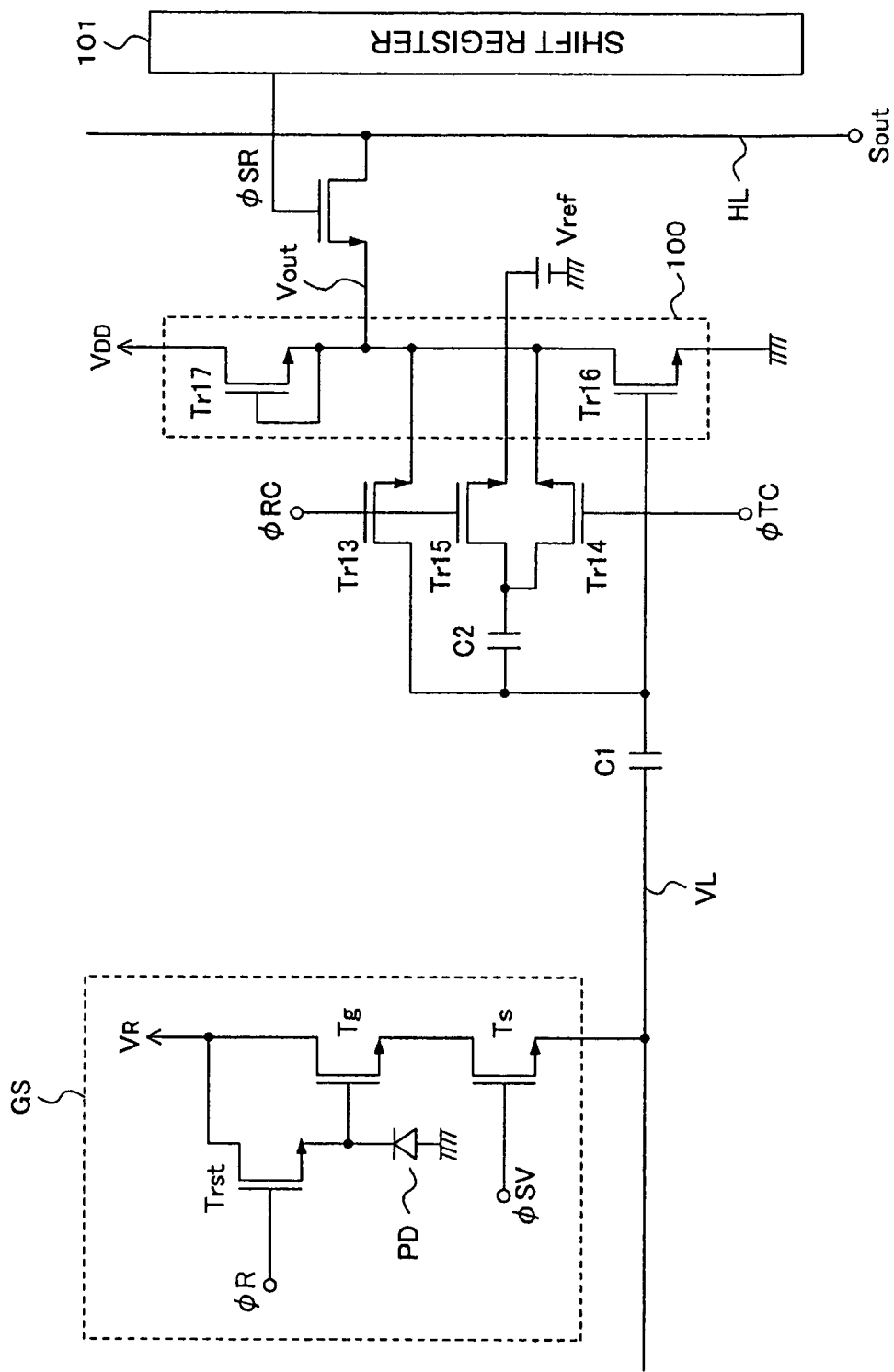
FIG. 9 is an explanatory diagram of the structure according to one conventional art.
Figure 11:
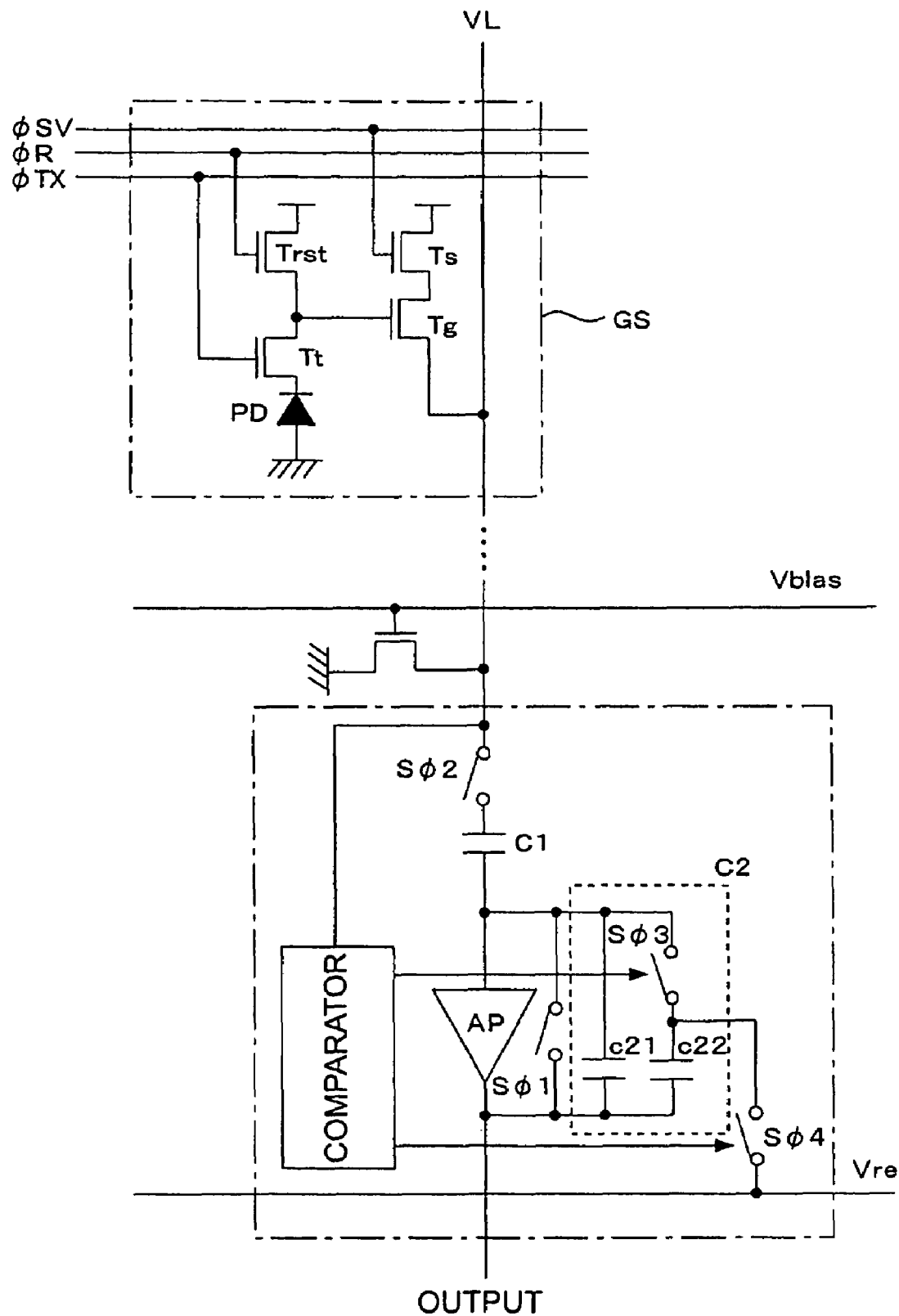
FIG. 11 is an explanatory diagram of the structure according to another conventional art.
Figure 12:
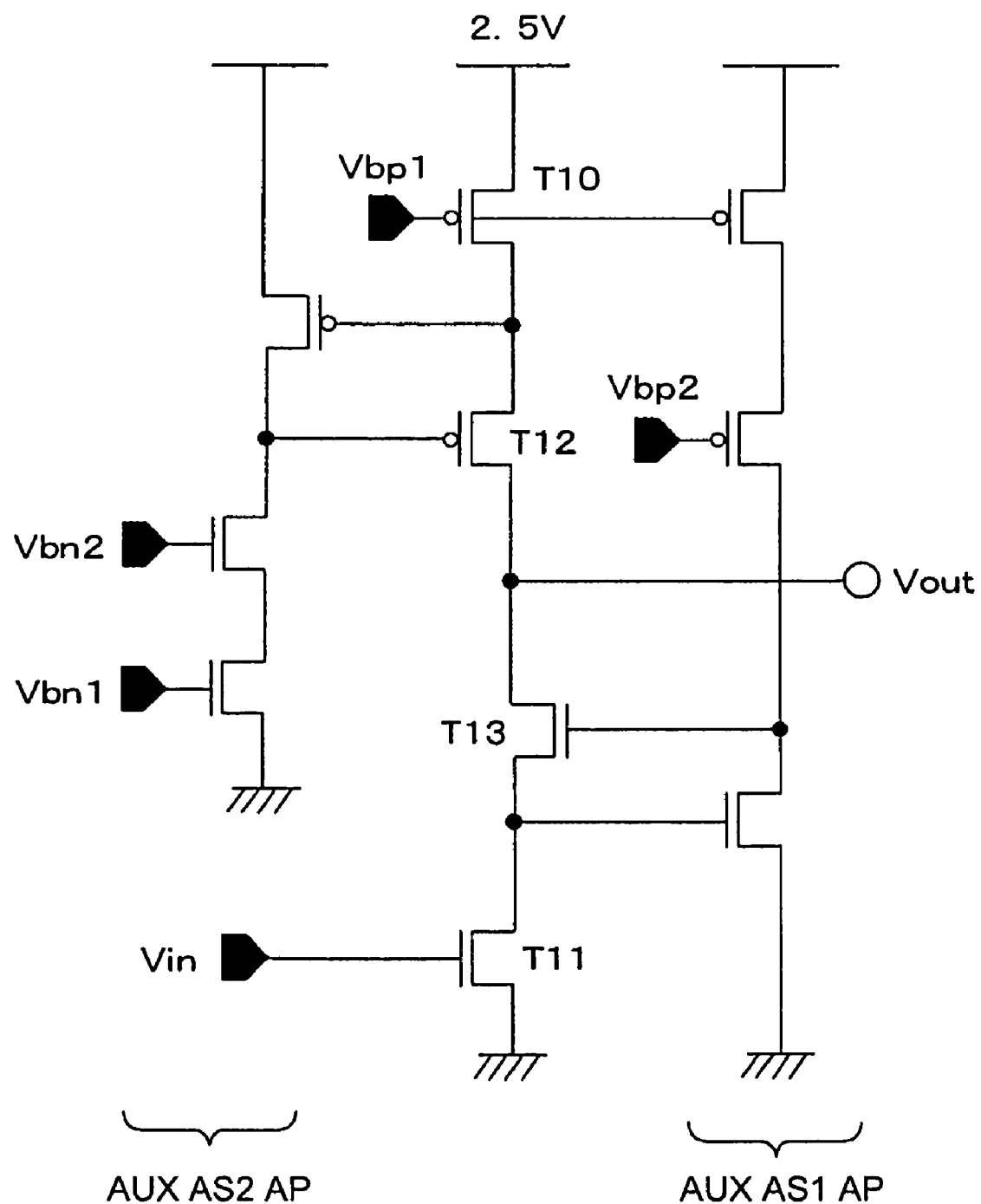
FIG. 12 is an explanatory diagram of an amplifier according to the other conventional art.
Figure 13:
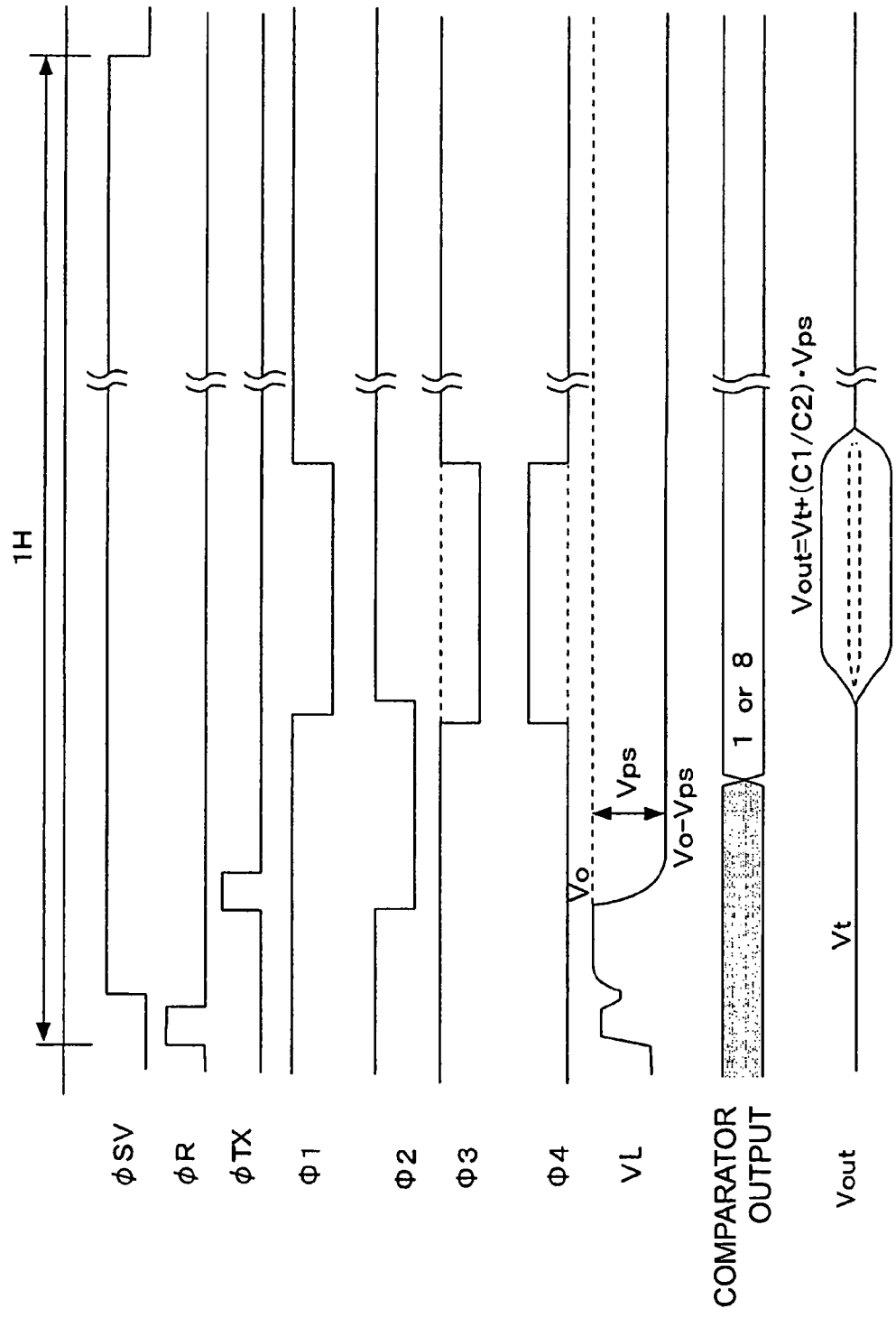
FIG. 13 is an explanatory diagram of an operating timing according to the other conventional art.
Figure 14:
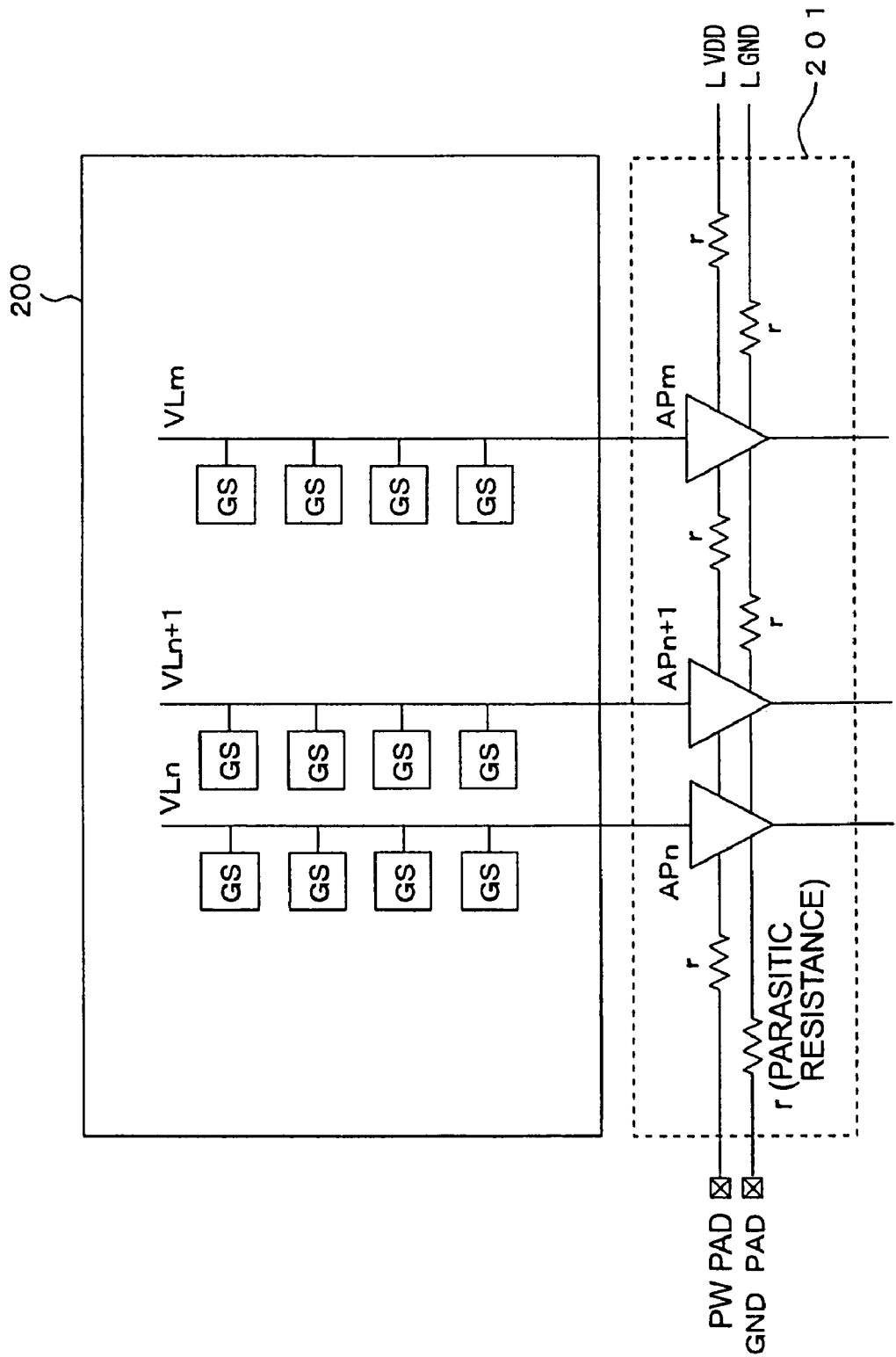
FIG. 14 is an explanatory diagram of the layout of the amplifier and a parasitic resistor.

The structure of pixel GS may be shown in FIG. 9 or 11. Referring to FIG. 9, the pixel GS comprises: a photodiode PD; a reset transistor Trst; an amplifying transistor Tg; and a reading transistor Ts. Alternatively, referring to FIG. 11, the pixel GS comprises: a photodiode PD; a reset transistor Trst; an amplifying transistor Tg; a reading transistor Ts; and a transfer gate Tt.

As shown in FIG. 1, one vertical scanning line L corresponds to the pixels in one row. In the structure of pixel GS shown in FIG. 9, one vertical scanning line L include a signal line for supplying pulses φR and φSV. In the pixel GS shown in FIG. 11, one vertical scanning line L includes a signal line for supplying pulses φR, φSV, and φTX.

According to the present invention, in order to read the pixels in the column parallel form, signal charges from pixels G arranged in the row direction in the pixel array 1 are simultaneously read and then are supplied to a vertical signal line VL (VL1, VL2 . . . ).

Specifically, the vertical scanning circuit 3 enables a signal at the reset level to be supplied to the vertical line VL from the pixels GS in the selected row (that is, P-phase reading), and then executes the operation for supplying the pixel signal in accordance with the charges stored in the photodiode PD to the vertical signal line VL (that is, D-phase reading). The vertical scanning circuit 3 sequentially executes the reading operation.

The pixel signal from the pixel GS in the selected row is read for a horizontal blanking period within one horizontal period. That is, for the horizontal blanking period, the pixel signals from the pixel GS in the row selected by the vertical scanning circuit 3 are output in parallel with the vertical signal lines VL1, VL2 . . . .

The pixel signal transferred to the vertical signal line VL from the pixel array 1 is processed by a column reading unit 5.

The column reading unit 5 comprises: an amplifier AP; a limiter LM; and a switch SW at each vertical signal line VL (column). Although the specific structure of amplifier AP and limiter LM will be described later, the amplifier AP comprises a capacitor, a switch element, and a charge integrating amplifier comprising a single-end amplifier. The amplifier AP forms a CDS (Correlated Double Sampling) circuit for sampling the pixel signal. Specifically, the differential between a P-phase reading level (reset level) and a D-phase reading level (data level) is sampled as the pixel signal and is output.

An output voltage of the amplifier AP is limited by a limiter LM.

The pixels signals are read in parallel from the row selected for the horizontal blanking period within the horizontal period. The pixel signals in the column sampled by the column reading-unit 5 is transferred to a horizontal signal line HL for a horizontal transfer period within the horizontal period by sequentially selecting switches SW by the horizontal scanning circuit 6 and are supplied to the output circuit 4.

The horizontal signal line HL includes, e.g., three horizontal signal lines HL1, HL2, and HL3. The amplifiers AP (and the limiters LM) in the columns are connected via switches SW to be distributed to the three horizontal signal lines HL1, HL2, and HL3 in the order. In the horizontal transfer, the amplifier AP drives the horizontal signal line HL. The amplifiers AP arranged to each column sequentially drive the horizontal signal lines HL1, HL2, and HL3. A multiplexer MPX sequentially selects and transfers the signals (output of the amplifier AP) to the horizontal signal lines HL1, HL2, and HL3. The signals become an image pick-up signal in one line and are supplied to the output circuit 4.

A plurality of horizontal signal lines HL are arranged because the amplifier AP arranged to each column does not drive one horizontal signal line fast. That is, a plurality of horizontal signal lines HL are arranged and the signals are horizontally transferred in parallel. The data rate per one horizontal signal line is reduced. Thus, the amplifier AP may have a relatively low driving capacity and, advantageously, the layout area is reduced.

The number of horizontal signal lines is three as one example, and may be two or four or more. Obviously, the data rate per horizontal signal line is reduced as long as the number of horizontal signal lines is larger. Generally, it is efficient and preferable that the number of horizontal signal lines is provided to have the same driving speed as that of the reading operation for the horizontal blanking period.

When the driving capacity of the amplifier AP is high, the signals may be horizontally transferred by one horizontal signal line.

The output circuit 4 performs, e.g., AGC processing and clamp processing, thereby obtaining an image pick-up signal for one horizontal period as a serial signal. Further, the output circuit 4 performs A/D conversion or the like, thereby obtaining an image pick-up signal as digital data. Furthermore, the digital signal processing is executed, including the digital gain processing and the white balance processing.

Through the processing, the image pick-up signal output from the output circuit 4 is subjected to the signal processing display operation. A display unit displays the image. Further, through the formatting processing and encoding processing, the data is recorded to a recording medium, is sent, and is output.

The timing generator 2 controls the operating timings of the vertical scanning circuit 3, the horizontal scanning circuit 6, the column reading unit 5, and the output circuit 4. The timing generator 2 controls the operating timings of the circuits and the units based on a vertical sync signal and a horizontal sync signal.

In the solid-state image pick-up device with the above-mentioned structure, the column reading unit 5 having the amplifier AP arranged to each column comprises the limiter LM and thus the current of the amplifier AP is always kept to be constant, irrespective of the level of pixel signal (strength of light) and the gain (C1/C2) of the amplifier AP in this case. As a consequence, the parasitic resistance exists and then the constant levels of power supply and ground prevent the problems of change in black level and horizontal stripe.

Figure 2:
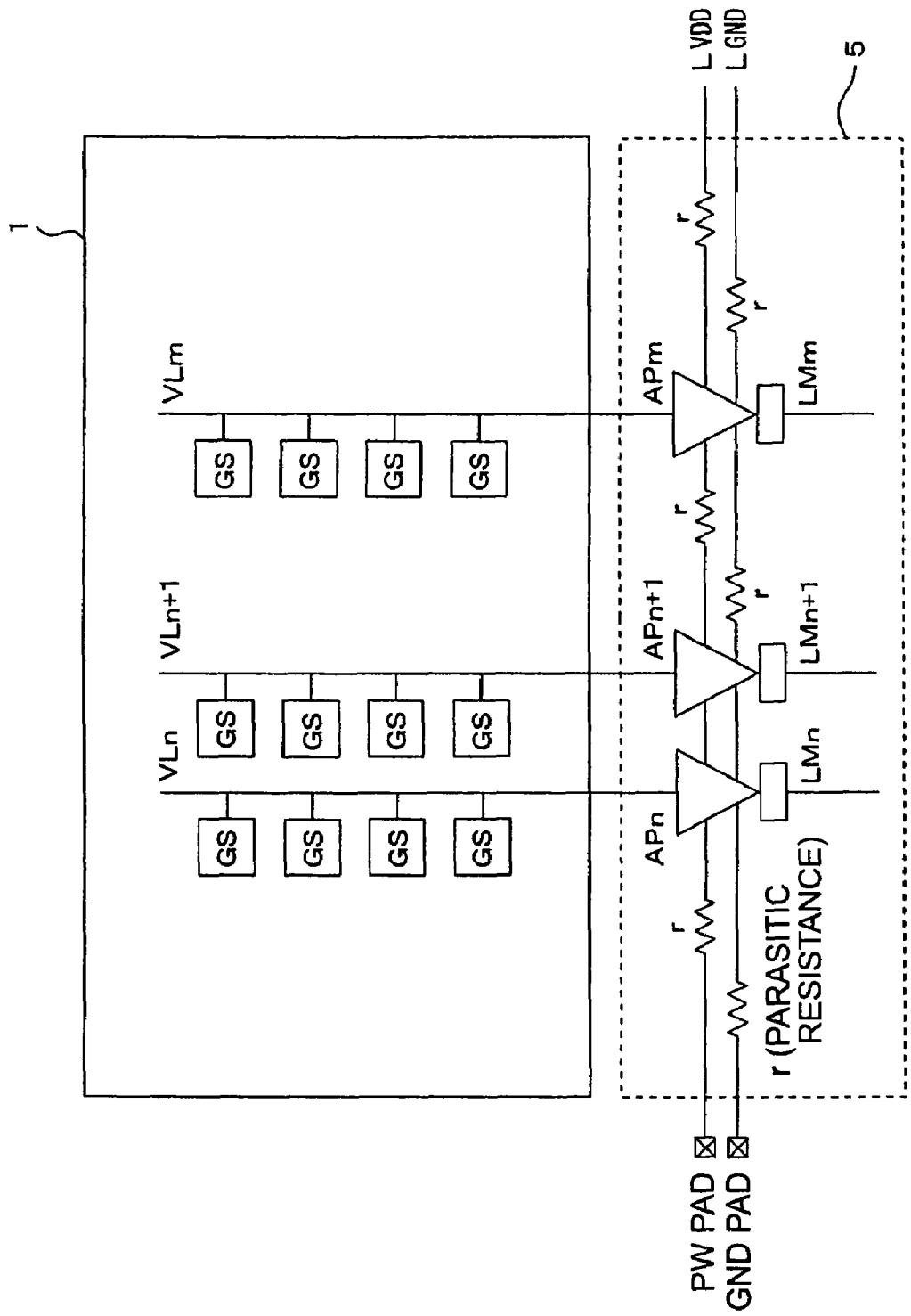
FIG. 2 is an explanatory diagram of the connecting structure of an amplifier and a limiter according to the present invention.

FIG. 2 shows the structure of the amplifier AP and limiter LM arranged to each column.

The column reading unit 5 comprises one amplifier AP (... APn, APn+1 ... APm) to each column of the pixel array 1, that is, to the vertical signal line VL (... VLn, VLn+1 ... VLm), and further comprises one limiter LM (... LMn, LMn+1 ... LMm) thereto.

A power supply line LVDD, a ground line LGND, and another wiring are formed to the above-arranged many amplifiers AP. The amplifiers AP are long wired from PADs (power PAD and GND-PAD) on a substrate in the horizontal direction. In this case, as mentioned above, the long wiring affects the influence of the parasitic resistance r and changes the consumption current of the amplifier AP, thereby causing the problem.

In the example, the amplifiers AP (... APn, APn+1 ... APm) arranged to the columns read the signals output to the vertical signal lines VL (... VLn, VLn+1 ... VLm) in the columns from the pixels GS. The voltage of the read signal is limited by the limiter LM (... LMn, LMn+1 ... LMm) arranged to the back so as to prevent a state in which it is not over one reference level.

The reference level is within the range for continuously flowing constant current, irrespective of the output level of the amplifier AP. Preferably, the reference level is out of the input range of the A/D converter arranged to the latter stage so as to prevent the influence to the image pick-up signal.

In the example shown in FIG. 2, the limiter LM is arranged independently at the back of the amplifier AP. However, the boarder between the limiter LM and the amplifier AP may not be clear. That is, the amplifiers AP and the limiters LM mixedly exist and thus the amplifier AP may not output the signal at one level or more.

Hereinbelow, a description is given of the specific structure of the amplifier AP and the limiter LM.

2. Structure of Amplifier/Limiter According to the First Embodiment

The structure of the amplifier AP and the limiter LM will be described according to the first embodiment with reference to FIGS. 3 to 5.

Figure 3:
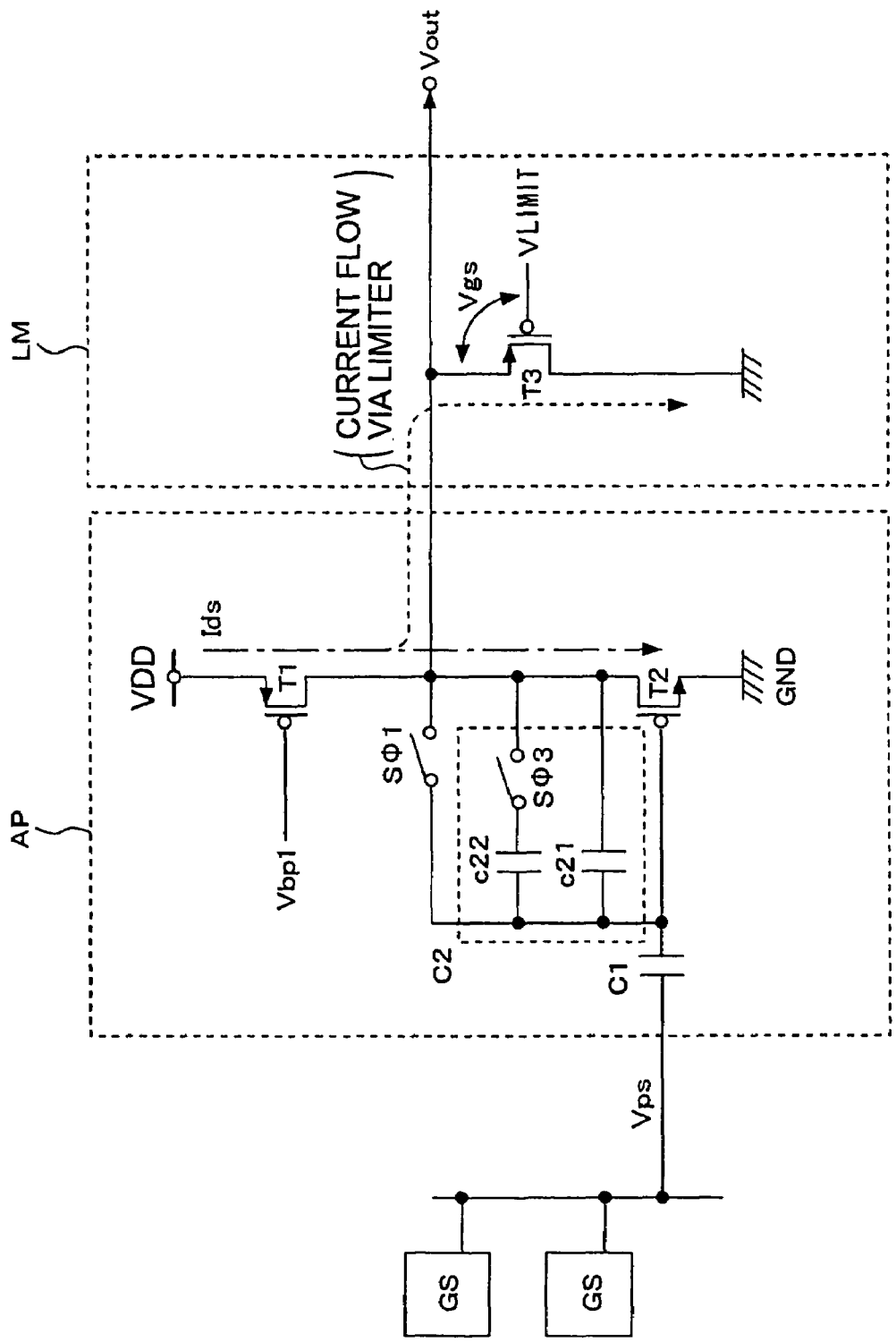
FIG. 3 is an explanatory diagram of an example of an amplifier/limiter circuit according to the first embodiment.
Figure 4:
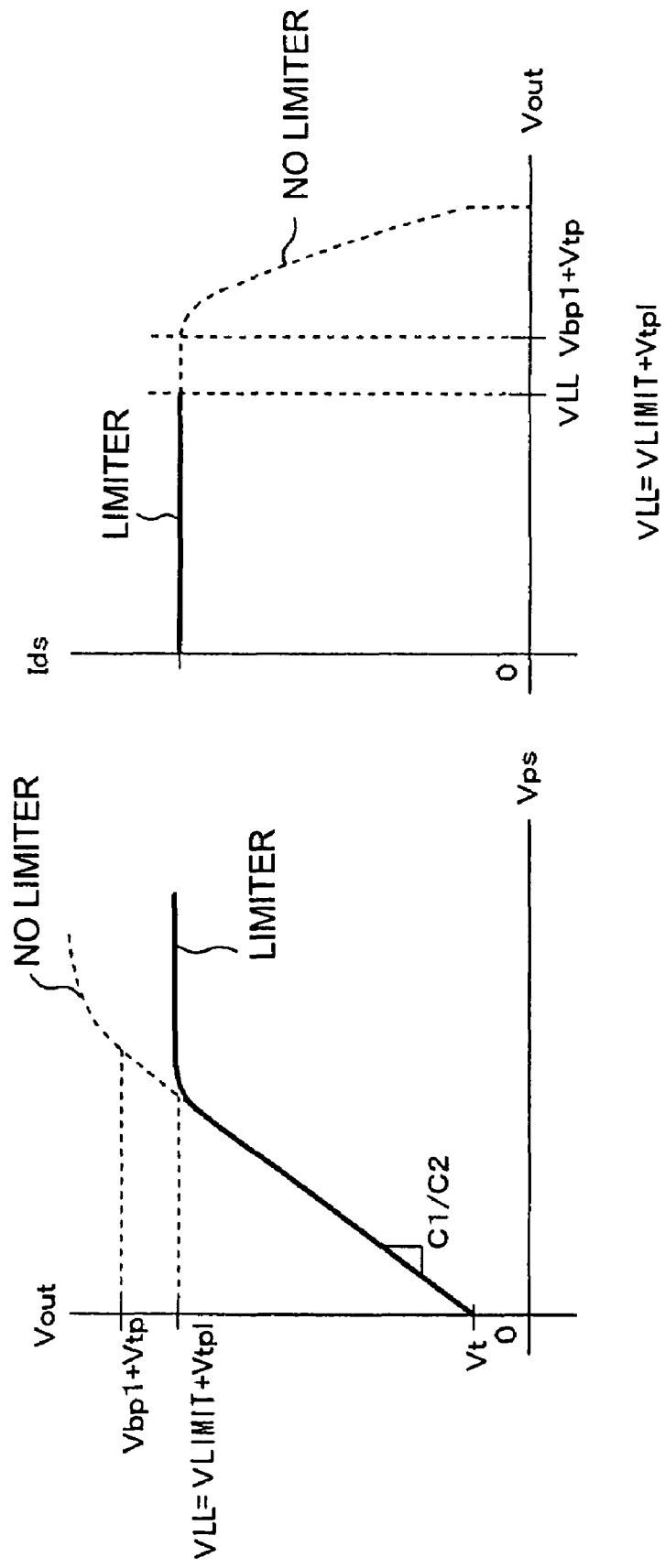
FIGS. 4A and 4B are explanatory diagrams of the limiter operation according to the first embodiment.

FIG. 3 shows a circuit example of the amplifier AP and the limiter LM in one column of the pixel array 1.

The amplifier AP is a resource ground amplifier comprising an N-channel MOS driving transistor T2 and a P-channel MOS current source load transistor T1, and capacitors C1 and C2.

Incidentally, FIG. 3 shows the example without any regulated cascade of the resource ground amplifier. The current source load transistor T1 functions as a current source of the current Ids by receiving a gate voltage Vbp1 and setting an operating voltage within a saturated are.

The capacitors C1 and C2 form the charge integrating amplifier. The capacitor C2 is a variable capacitor comprising capacitors c21 and c22 and a switch Sϕ3, thereby changing the reading gain.

The switch Sϕ1 is a reset switch which initializes the capacitor C2.

The limiter LM comprises only the P-channel MOS transistor T3. A voltage VLIMIT for setting a reference level using the limiter is applied to a gate of the transistor T3. A source of the transistor T3 is connected an output terminal Vout of the amplifier AP, and a drain of the transistor T3 is connected to the ground.

The transistor T3 is conductive when the output voltage Vout is higher than a predetermined limiter level VLL (=VLIMIT+Vtp1), and then the current Ids via the transistor T1 is shut off. The voltage Vtp1 is a threshold voltage of the transistor T3.

Hereinbelow, a description is given of the operation of the amplifier AP and the limiter LM with reference to FIGS. 4A and 4B.

The amplifier AP inputs an input voltage Vps of the signal from the pixel GS, and sets the signal Vps to an output voltage Vout by the gain serving as a capacitance ratio (C1/C2).

Figure 15B:
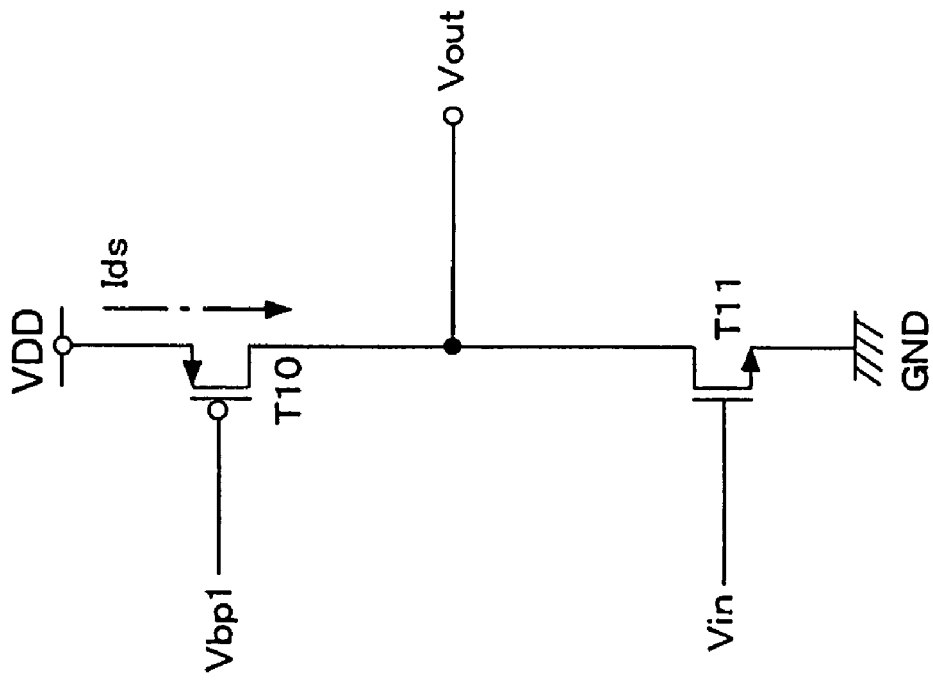
FIGS. 15A and 15B are explanatory diagrams of the current characteristic of the amplifier.
Figure 15A:
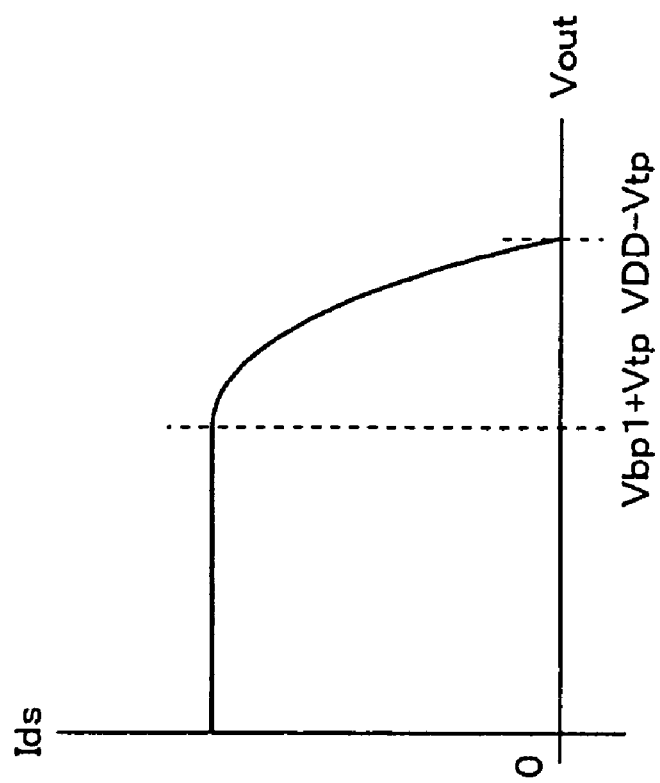

If the limiter LM (transistor T3) is not arranged, the amplifier shown in FIG. 3 is the same as that shown in FIGS. 15A and 15B according to the conventional arts. When the output voltage Vout is higher than a voltage (Vbp1+Vtp), the transistor T1 enters a linear area and thus does not function as the current source.

Reference symbol Vbp1 denotes a gate voltage of the transistor T1, and reference symbol Vtp denotes a threshold voltage of the transistor T1.

Referring to FIGS. 4A and 4B, the structure without the limiter LM is shown by a broken line.

Referring to FIG. 4A, the abscissa axis is the input voltage (signal Vps) of the amplifier AP, and the ordinate axis is the output voltage Vout. In this case, until the output voltage Vout reaches a voltage (Vbp1+Vtp), the input/output characteristic is indicated by the inclination of the gain serving as the capacitance ratio (C1/C2). However, the output voltage Vout is higher than the voltage (Vbp1+Vtp), the input/output characteristic is shown by a curve as shown in FIG. 4A. Referring to FIG. 4B, the abscissa axis is the output voltage Vout, and the ordinate axis is the current Ids. The output voltage Vout is higher than the voltage (Vbp1+Vtp) and then the current Ids of the amplifier AP decreases.

On the contrary, according to the first embodiment, the limiter LM is arranged, when the output voltage Vout is higher than a limiter level VLL (=VLIMIT+Vtp1), the transistor T3 is conductive. The current Ids via the transistor T1 is shut off, thereby preventing the increase in output voltage Vout.

As shown by a bold line in FIG. 4A, the function of the limiter LM prevents a state in which the output voltage Vout is not higher than the voltage (VLIMIT+Vtp1) as the top level.

As will be understood with reference to FIG. 4B, the limiter LM limits the output voltage Vout shown by the bold line to the voltage (VLIMIT+Vtp1) serving as the top level and thus the output voltage Vout varies within the range for keeping the constant current Ids.

In other words, the voltage VLL (=VLIMIT+Vtp1) as the limiter level is set to be lower than the voltage (Vbp1+Vtp), thereby guaranteeing that the transistor T1 is always within the saturated area. It is possible to keep the constant consumption current for the entire structure of the amplifier AP and the limiter LM.

With the above-mentioned structure, as shown in FIG. 2, the limiter LM ( . . . LMn, LMn+1 . . . LMm) limits the output of the amplifier AP ( . . . APn, APn+1 . . . APm) so that it is not over a reference level. Thus, the amplifier AP continuously flows the constant current Ids, irrespective of the output level. In this case, in order to prevent the influence on the image pick-up signal from the limiter operation, preferably, the top limit of the output voltage Vout, namely, the limiter level VLL is set out of the input range of the A/D converter arranged at the latter stage (e.g., in the output circuit 4 FIG. 1).

Figure 5:
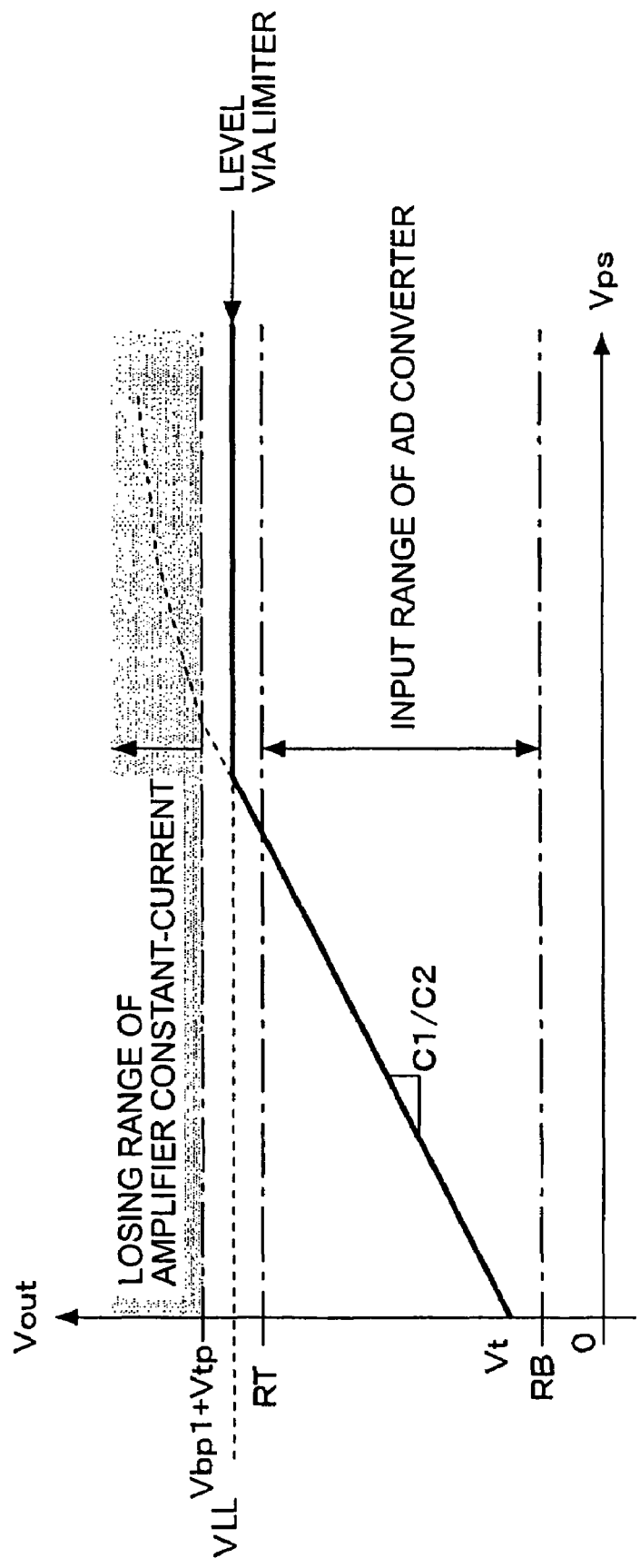
FIG. 5 is an explanatory diagram of a limit level and an A/D converting range according to the first embodiment.

FIG. 5 shows the A/D converting range of limiter level according to the first embodiment. In this case, the limiter LM limits the top voltage of the amplifier AP. Normally, the input range of the A/D converter uses a linear input/output characteristic of the amplifier AP. Within the input range of the A/D converter, reference symbol RT denotes a top limit and reference symbol RB denotes a bottom limit. Then, the limiter level VLL is higher than the top limit RT and does not change the current value of the amplifier AP, namely, is lower than the voltage Vbp1+Vtp.

By such a setting, the output voltage Vout is clipped within the range of voltage higher than the limiter level VLL, thereby preventing influence on the image. Because the output voltage Vout clipped by the limiter LM is higher than the limiter level VLL without the limiter LM and the output voltage Vout is clipped over the top limit of the range of the A/D converter. In other words, the limiter level VLL is set out of the input range of the A/D converter, thereby limiting, by the limiter LM, the output voltage Vout serving as the voltage clipped by the A/D converter. Thus, the presence/absence of the limiter LM does not influence on the output of the A/D converter and the limiter operation does not influence the image pick-up signal.

If the limiter level VLL is not freely set, the top limit RT and bottom limit RB of the A/D converter may change. Generally, the top limit RT is set to the same level as the saturated level of the pixel signal by the lowest gain of the amplifier AP determined depending on the ratio C1/C2, and the bottom limit RB is set to the same level at the dark part.

Although the arrangement position of the A/D converter is not limited, as shown in FIG. 5, the amplifier AP is DC-connected to the A/D converter. The arrangement of the gain component or the DC offset between the amplifier AP and the A/D converter needs the setting of the limiter level.

In the structure shown in FIG. 3, after the transistor T3 is conductive, the flow of the entire current Ids of the transistor T1 does not stop quickly. Therefore, the output voltage Vout slightly and continuously increases. However, the increase in output voltage Vout results in a rise in voltage Vgs between the gate and the source of the transistor T3 and therefore, in the future, the transistor T3 completely stops the flow of the current Ids of the transistor T1 and the increase in output voltage Vout entirely stops.

The "small increase in output voltage Vout" is determined depending on the transmitting conductance of the transistor T3, and must properly be determined depending on the margin between the voltages VLIMIT+Vtp1 and Vbp1+Vtp.

If the gate voltage VLIMIT of the transistor T3 is excessively low so that the limiter is operated without fail, the output range of the amplifier is narrow and may interfere with the top limit RT of the A/D converter. Further, if the size of the transistor T3 is excessively large so as to reduce the "small increase in output voltage Vout", the leakage of current during the normal operation might rise.

3. Structure of Amplifier/Limiter According to the Second Embodiment

Figure 6:
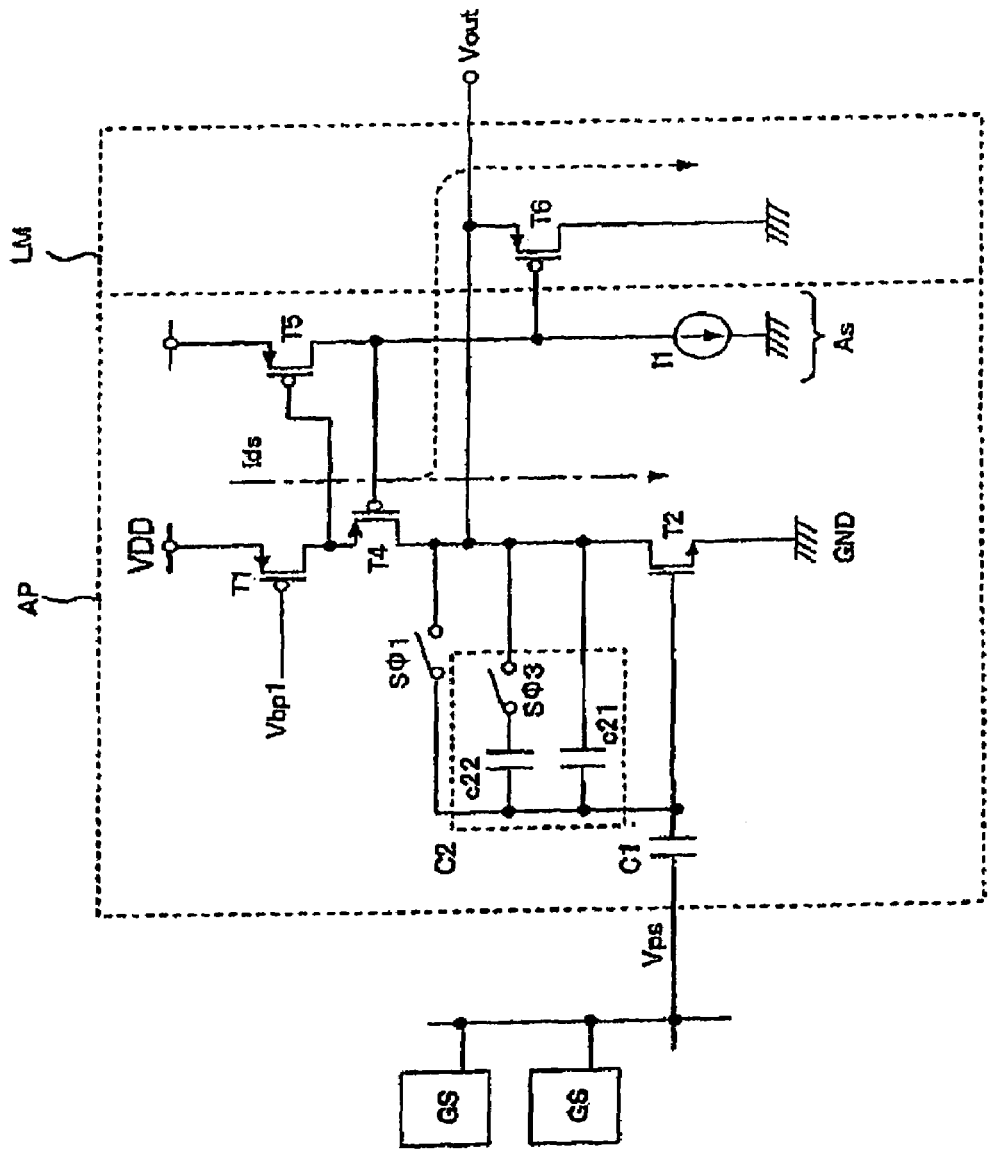
FIG. 6 is an explanatory diagram of an example of an amplifier/limiter circuit according to the second embodiment.

FIG. 6 shows the structure of the amplifier AP and the limiter LM according to the second embodiment.

Unlike the structure shown in FIG. 3, the amplifier AP uses the regulated cascade structure. That is, in addition to the structure shown in FIG. 3, the amplifier AP comprises a P-channel MOS transistor T4 cascade-connected to a current source load transistor T1. Further, the amplifier AP comprises an auxiliary amplifier AP comprising a P-channel MOS transistor T5 and a current source I1.

The above-structured amplifier AP uses a limiter LM comprising only the P-channel MOS transistor T3 shown in FIG. 3. However, the amplifier AP shown in FIG. 6 does not use the reference gate voltage VLIMIT. In the limiter LM shown in FIG. 6, a source terminal of a P-channel MOS transistor T6 is connected to the output terminal of the amplifier AP, a drain terminal thereof is connected the ground, and a gate terminal thereof is connected to a gate terminal (output terminal of the auxiliary amplifier As) of the cascade MOS transistor T4.

Referring to FIG. 6, in the regulated cascade, a drain source voltage Vds(T3) of the transistor T3 serving as the current source is a voltage Vgs(T5) between the drain source and the gate source of the transistor T5 of the auxiliary amplifier As.

The auxiliary amplifier As applies the negative feedback to the transistor T4 so that the voltage Vgs(T5) between the gate and the source is constant. Consequently, a drain source voltage Vds(T1) of the transistor T1 is constant. If the drain source voltage Vds(T1) of the transistor T1 is a voltage (i.e., voltage lower than the voltage (Vbp1+Vtp)) for operating the transistor T1 within a saturated area, the transistor T1 flows the constant current against the change in output voltage Vout.

However, the negative feedback is applied to the transistor T4 only when the transistor T4 is within the saturated area. The output voltage Vout increases and then a drain source voltage Vds(T4) of the transistor T4 decreases and enters the linear area.

Thus, the transmitting conductance of the transistor T4 reduces and the feedback gain of the auxiliary amplifier As also drops. As a consequence, the change in output voltage Vout is transmitted as the change in drain source voltage Vds(T1) of the transistor T1.

The auxiliary amplifier As is the source ground amplifier comprising one P-channel MOS transistor T5 and, normally, has the gain of approximately 50 times. Then, the transistor T4 enters the linear area and then the drain source voltage Vds(T1) of the transistor T1 changes. In this case, the output of the auxiliary amplifier As changes by 50 times of the voltage Vds(T1). Hence, the output of the auxiliary amplifier As has a function of a flag indicating a sign before the transistor T1 enters the linear area.

For advantageously using the function, in the limiter LM, the gate of the P-channel MOS transistor T6 is connected to the output terminal of the auxiliary amplifier (namely, the drain of the transistor T5), the source thereof is connected to the output voltage Vout, and the drain thereof is connected to the ground.

The transistor T6 of the limiter LM enables the change in drain source voltage Vds(T1) of the transistor T1 to be multiplied by the time of the gain of the auxiliary amplifier As, thereby changing a voltage Vgs(T6) between the gate and the source of the transistor T6. The transistor T6 is conductive before the transistor T1 enters the linear area. The current Ids does not flow and thus the transistor T1 exists within the saturated area.

According to the first embodiment, the limiter level is controlled by applying the reference voltage VLIMIT to the gate of the transistor T3 in the limiter LM. In this case, the voltage VLIMIT must be determined in consideration of the threshold voltage Vth of the transistor T3, the threshold voltage Vth of the transistor T1, and "the small increase of output voltage Vout" determined depending on the transmitting conductance of the transistor T3.

In contrast, according to the second embodiment as shown in FIG. 6, the transistor T1 detects by itself that it enters the linear area and sets by itself the limiter. The limiter is certainly set, irrespective of the variation in devices.

Further, according to the first embodiment, the gate of the transistor T3 has a fixed potential serving as the voltage VLIMIT. On the other hand, according to the second embodiment, the output voltage of the auxiliary amplifier As is active. In this case, the amount of change in the voltage Vgs(T6) between the gate and the source is large. Even for the smaller size of transistor, the current Ids of the transistor T1 stops. This is advantageous to prevent the leakage of current in the normal operation.

Figure 7A:
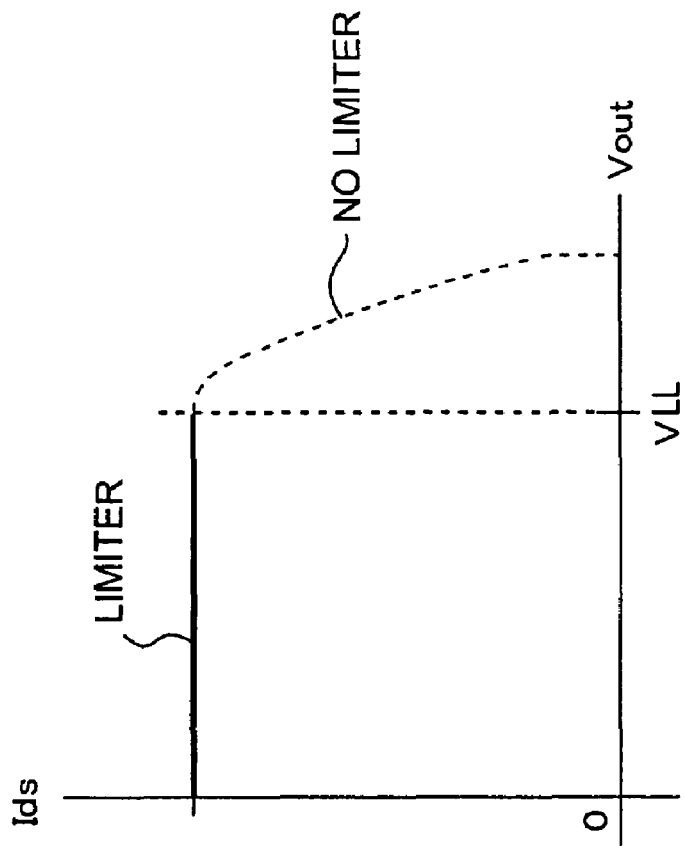
FIGS. 7A and 7B are explanatory diagrams of the limiter operation according to the second embodiment.
Figure 7B:
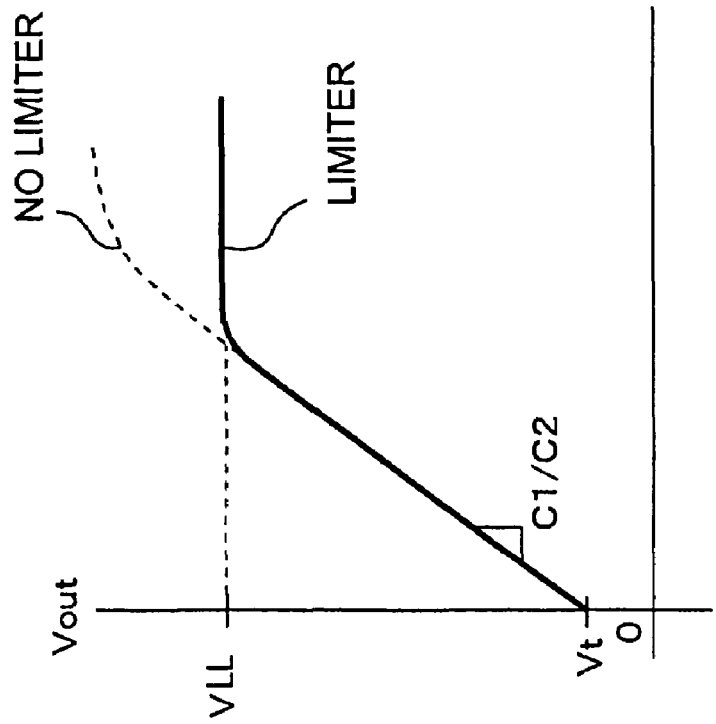

FIGS. 7A and 7B show operating examples according to the second embodiment. Incidentally, the abscissa and the ordinate in FIGS. 7A and 7B are similar to those in FIGS. 4A and 4B. Similarly, upon using the limiter LM, the input/output characteristic and the output voltage-current characteristic are shown by bold lines.

According to the second embodiment, the structure of the amplifier AP shown in FIGS. 7A and 7B is different from that shown in FIG. 6 according to the first embodiment. However, the amplifier AP uses the charge integrating amplifier comprising the capacitors C1 and C2 both in FIG. 6 and FIGS. 7A and 7B according to the first and second embodiments. The input signal Vps is read by using the gain C1/C2.

The voltage VLL for using the limiter starts to change the drain source voltage Vds(T1) of the transistor T1. Thus, the voltage VLL enables the transistor T4 to enter the linear area.

The source voltage of the transistor T4 is determined depending on the voltage Vgs(T5) between the gate and the source of the transistor T5, and is a power voltage VDD−Vgs(T5). The output voltage Vout for enabling the transistor T4 to enter the linear area is a voltage [VDD−Vgs(T5)−Vgs(T4)+Vth(T4)]. Incidentally, this relationship is established when threshold voltage Vth (T4) of the transistor T4<threshold voltage Vth(T6) of the transistor T6.

On the contrary, when Vth(T4)>Vth(T6), the transistor T6 is conductive before the transistor T4 enters the linear area and the operation is the same as that according to the first embodiment. In this case, the gate voltage of the transistor T6, corresponding to the reference voltage VLIMIT, according to the first embodiment is a voltage [VDD−Vgs(T5)−Vgs(T4)]. Therefore, the limiter operates when the voltage is [VDD−Vgs(T5)−Vgs(T4)+Vth(T6)].

In this case, the limiter acts before the transistor T4 enters the linear area. Therefore, the limiter operates slightly fast. Therefore, in the case of Vth(T4)<Vth(T6), the output range of the amplifier AP is advantageously used, an effective voltage [Vgs(T6)−Vth(T6)] of the transistor T6 in the normal operation is small. This is advantageous against the leakage of voltage.

In the case of using the same P-channel MOS transistor, the larger back-bias is applied to the transistor T6, as compared with the transistor T4 and therefore a relationship of Vth(T4)<Vth(T6) is obtained without any operation. Preferably, the relationship of Vth(T4)<Vth(T6) is established by adjusting the transistor size or the concentration of impurity in consideration of the variation.

4. Structure of Amplifier/Limiter According to the Third Embodiment

Figure 8:
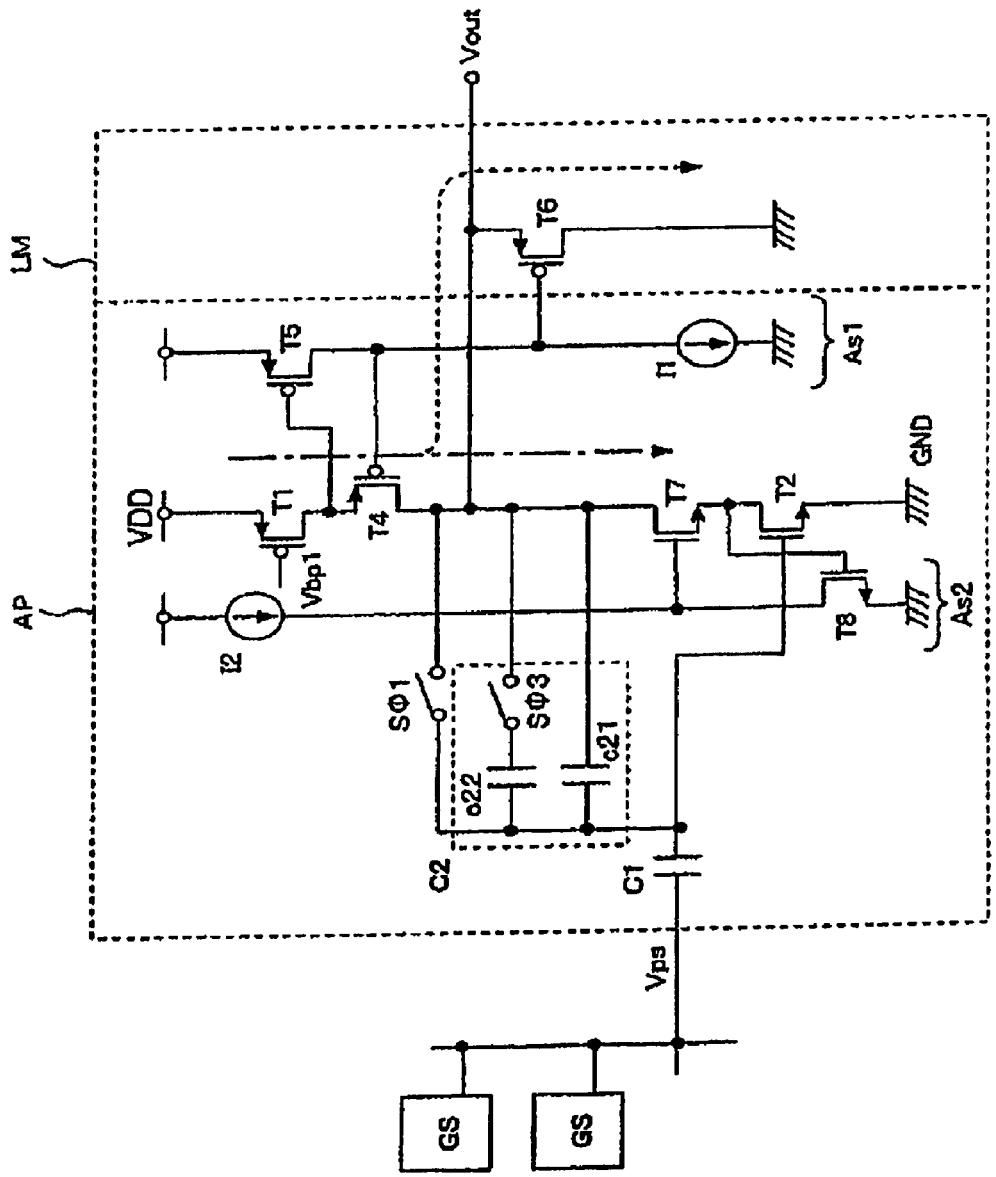
FIG. 8 is an explanatory diagram of an example of an amplifier/limiter circuit according to the third embodiment.

FIG. 8 shows the structure of an amplifier AP and a limiter LM according to the third embodiment.

The structure shown in FIG. 8 is different from that according to the second embodiment in two regulated cascades.

Referring to FIG. 8, the P-channel MOS transistor T4 cascade-connected to the current source load transistor T1 is arranged, and the amplifier AP comprises an auxiliary amplifier As1 comprising a P-channel MOS transistor T5 and a current source I1.

Further, an N-channel MOS transistor T7 cascade-connected to the driving transistor T2 is arranged. The amplifier AP comprises an auxiliary amplifier As2 comprising an N-channel MOS transistor T8 and a current source I2.

The structure of the limiter LM shown in FIG. 8 is the same as that shown in FIG. 6, and the operation of the limiter LM is the same as that shown in FIGS. 7A and 7B.

As shown in FIG. 8, the addition of the regulated cascade to the driving transistor T2 enables the use of the limiter LM without any trouble. The amplifier AP with the above-mentioned structure can have the limiter LM shown in FIG. 3 according to the first embodiment.

5. Advantages of Embodiments and Modifications

According to the first to third embodiments, when the high input-voltage Vps is applied from the pixel GS so that the current Ids via the amplifier AP changes, the limiter LM limits the output voltage Vout within the range of no-change in current Ids, and thus the levels of the power and the ground are constant. Therefore, the black level is always constant and the problem of the stripe is solved when the strong light is partly received to the screen.

Further, the single-end amplifier weak in change in power supply and ground can be used without any trouble. Under the limiting condition of the layout corresponding to the pixel pitch for each column, the single-end amplifier with the simple structure contributes to the reduction in layout area.

Although the amplifier AP may be a differential amplifier, advantageously, the single-end amplifier is used according to the present invention.

The amplifier AP having the regulated cascade uses the limiter LM according to the second and third embodiments, thereby guaranteeing the limiter operation without fail, irrespective of the variation. The margin is increased against the problem of the leakage of the limiter circuit in the normal operation.

According to the first to third embodiments, the amplifier comprises the N-channel MOS transistor serving as the driving transistor and the P-channel MOS transistor serving as the current source transistor, and the limiter circuit limits the top level of amplifier output voltage Vout.

Of course, the above-mentioned structure depends on the structure of the amplifier AP. Therefore, the amplifier AP may comprise the P-channel MOS transistor serving as the driving transistor and the N-channel MOS transistor serving as the current source transistor and then the limiter circuit limits the bottom level of amplifier output Vout. In this case, the limiter LM comprises the N-channel MOS transistor.

Further, depending on the structure of the amplifier AP, the limiter circuit may limit both the top and bottom levels. In this case, both the N-channel MOS transistor and the P-channel MOS transistor function as the limiters LM.

What is claimed is:

1. A pixel signal reading method comprising:
   providing an array of pixels disposed in rows and columns;
   outputting, to a corresponding vertical signal line of a plurality of vertical signal lines respectively disposed for each column of pixels, a pixel signal from an image pick-up pixel of a selected row of pixels;
   amplifying the pixel signal appearing on each vertical signal line via an amplifier element disposed on each vertical line and limiting an output of each respective amplifier element for the vertical signal line of each column; and
   thereafter separately transferring the pixel signals output from the plurality of amplifiers,
   wherein said limiting step includes limiting a consumption current of said amplifier element to be substantially constant.

2. The pixel signal reading method of claim 1, further comprising:
   sequentially selectively applying an amplified and limited output from each member of a first set of vertical signal lines to a first horizontal signal line and sequentially selectively applying an amplified and limited output from each member of a second set of vertical signal lines to a second horizontal signal line.

3. The pixel signal reading method of claim 1, further comprising:
   sequentially selectively applying an amplified and limited output from each member of a first set of vertical signal lines to a first horizontal signal line and sequentially selectively applying an amplified and limited output from each member of a second set of vertical signal lines to a second horizontal signal line and sequentially selectively applying an amplified and limited output from each member of a third set of vertical signal lines to a third horizontal signal line.

4. The pixel signal reading method of claim 1, wherein the amplifier includes a correlated double sampling circuit, and said amplifying step includes a step of sampling the differential between a reset reading level and a data reading level.

5. The pixel signal reading method of claim 1, further providing a resource ground amplifier as the amplifier.

6. The pixel signal reading method of claim 1, further providing a charge integrating amplifier as the amplifier.

7. The pixel signal reading method of claim 1, wherein the array of pixels comprise a CMOS imager, and the vertical signal lines connecting each image pick-up pixel in a column to a respective amplifier is provided as a metal wiring.

8. A pixel signal reading method comprising:
   providing an array of pixels disposed in rows and columns;
   outputting, to a corresponding vertical signal line of a plurality of vertical signal lines respectively disposed for each column of pixels, a pixel signal from an image pick-up pixel of a selected row of pixels;
   amplifying the pixel signal appearing on each vertical signal line via an amplifier element disposed on each vertical line and limiting an output of each respective amplifier element for the vertical signal line of each column; and
   thereafter separately transferring the pixel signals output from the plurality of amplifiers,
   wherein said limiting step includes keeping a current source load transistor contained in said amplifier element operating in a saturated state.

9. A pixel signal reading method comprising:
   providing an array of pixels disposed in rows and columns;
   outputting, to a corresponding vertical signal line of a plurality of vertical signal lines respectively disposed for each column of pixels, a pixel signal from an image pick-up pixel of a selected row of pixels;
   amplifying the pixel signal appearing on each vertical signal line via an amplifier element disposed on each vertical line and limiting an output of each respective amplifier element for the vertical signal line of each column; and
   thereafter separately transferring the pixel signals output from the plurality of amplifiers,
   further providing a limiter comprising an MOS transistor having a gate terminal connected to a reference potential, the reference potential at least partially determining what voltage level to prevent the output of the amplifier from going above.

10. The pixel signal reading method of claim 9, wherein the output of the amplifier is limited by the limiter to a voltage equal to VLIMIT+Vthl, wherein VLIMIT is the reference potential applied to the gate terminal of the MOS transistor of the limiter, and Vthl is the threshold voltage level of the MOS transistor of the limiter.

* * * * *